United States Patent
Hu (10) Patent No.: US 9,088,356 B2
(45) Date of Patent: Jul. 21, 2015

(54) TRANSLATING BETWEEN TESTING REQUIREMENTS AT DIFFERENT REFERENCE POINTS

(71) Applicant: Teck Hu, Melbourne, FL (US)

(72) Inventor: Teck Hu, Melbourne, FL (US)

(73) Assignee: Alcatel Lucent, Boulogne-Billancourt (FR)

(*) Notice: Subject to any disclaimer, the term of this patent is extended or adjusted under 35 U.S.C. 154(b) by 259 days.

(21) Appl. No.: 13/667,592

(22) Filed: Nov. 2, 2012

(65) Prior Publication Data

US 2014/0128006 A1    May 8, 2014

(51) Int. Cl.
*H04B 17/15* (2015.01)
*H04B 17/10* (2015.01)

(52) U.S. Cl.
CPC ............. *H04B 17/15* (2015.01); *H04B 17/104* (2015.01)

(58) Field of Classification Search
CPC ..... H04W 52/04; H04W 16/14; H04W 52/16; H04W 52/243; H04W 52/30; H04W 72/042; H04W 88/187; H04B 15/00; H04B 17/0057; H04B 1/7136; H04B 17/0015; H04B 1/715
USPC ............. 455/67.11, 67.13, 226.1, 114.1, 423; 370/332
See application file for complete search history.

(56) References Cited

U.S. PATENT DOCUMENTS

| | | | | |
|---|---|---|---|---|
| 5,465,393 A * | 11/1995 | Frostrom et al. | ............... | 455/423 |
| 6,047,171 A * | 4/2000 | Khayrallah et al. | ........... | 455/266 |
| 6,094,576 A * | 7/2000 | Hakkinen et al. | ........... | 455/422.1 |
| 6,952,181 B2 * | 10/2005 | Karr et al. | ................. | 342/457 |
| 7,043,242 B2 * | 5/2006 | Kuiri et al. | .................... | 455/436 |
| 7,133,460 B2 * | 11/2006 | Bae et al. | ........................ | 375/295 |
| 7,535,425 B2 * | 5/2009 | Vicharelli et al. | ............. | 343/703 |
| 8,059,772 B2 * | 11/2011 | He | ................. | 375/350 |
| 8,165,599 B1 * | 4/2012 | Dronamraju et al. | ...... | 455/456.1 |
| 8,195,171 B2 * | 6/2012 | Bernini et al. | ................ | 455/446 |
| 8,346,282 B1 * | 1/2013 | Dronamraju et al. | ...... | 455/456.1 |
| 8,532,232 B2 * | 9/2013 | Ghosh | ........................ | 375/341 |
| 8,761,791 B2 * | 6/2014 | Zhou et al. | ................. | 455/452.2 |
| 2003/0194001 A1 | 10/2003 | Barksdale, Jr. | | |
| 2007/0223525 A1 * | 9/2007 | Shah et al. | .................... | 370/468 |
| 2009/0135973 A1 * | 5/2009 | He | ................. | 375/350 |
| 2009/0279513 A1 * | 11/2009 | Chang et al. | ................. | 370/336 |
| 2010/0120415 A1 * | 5/2010 | Urquhart et al. | .............. | 455/424 |
| 2011/0069780 A1 * | 3/2011 | Novak et al. | .................. | 375/295 |
| 2011/0244887 A1 * | 10/2011 | Dupray et al. | ............. | 455/456.2 |

(Continued)

OTHER PUBLICATIONS

Alcatel-Lucent, AAS Requirements—Summary and Views, 3GPP TSG RAN WG4 Meeting #65 R4-12xxxx, 6.18, New Orleans, USA, Nov. 12-16, 2012.

(Continued)

*Primary Examiner* — Minh D Dao
(74) *Attorney, Agent, or Firm* — Davidson Sheehan LLP (57) ABSTRACT

Embodiments of the claimed subject matter provide a method and apparatus for translating testing requirements between different reference points. Some embodiments of the method include generating mapping information that relates at least one first requirement associated with an active antenna array to at least one second requirement associated with the active antenna array. The first requirements are associated with a first reference point and the second requirements are associated with a second reference point that differs from the first reference point. Some embodiments of the method also include storing the mapping information in a non-transitory computer-readable storage media.

21 Claims, 6 Drawing Sheets

(56) References Cited

U.S. PATENT DOCUMENTS

| | | | |
|---|---|---|---|
| 2013/0084853 A1* | 4/2013 | Mineda et al. | 455/425 |
| 2013/0100891 A1* | 4/2013 | Yang et al. | 370/328 |
| 2013/0109402 A1* | 5/2013 | Zhou et al. | 455/452.2 |
| 2013/0288692 A1* | 10/2013 | Dupray et al. | 455/450 |

OTHER PUBLICATIONS

Huawei; Discussion on receiver requirements 3GPP TSG-RAN WG4 Meeting #64Bis R4-125494 10.3.4, Santa Rosa, USA, Oct. 8-12, 2012.

Alcatel-Lucent, ACLR Considerations 8.3.4. 3GPP TSG-RAN WG4 Meeting #64 R4-124046 Qingdao, China, Aug. 13-17, 2012.

Huawei, Discussion on the transmitter characteristics and requirements 3GPP TSG-RAN WG4 meeting #64Bis R4-125491, 10.3.4, Santa Rosa, USA, Oct. 8-12, 2012.

Alcatel-Lucent: "Requirements Points for AAS", 3GPP Draft; R4-125133 AAS Reqpoints, vol. RAN WG4, Oct. 12, 2012, 2 pages.

Ericsson et al., "On Defining Spatial ACLR", 3GPP Draft; R4-124425, vol. RAN WG4, Aug. 6, 2012, 7 pages.

International Search Report and Written Opinion correlating to PCT/US2013/067369 dated Jan. 23, 2014, 13 pages.

* cited by examiner

TRANSLATING BETWEEN TESTING REQUIREMENTS AT DIFFERENT REFERENCE POINTS

BACKGROUND

This application relates generally to communication systems, and, more particularly, to wireless communication systems.

Conventional wireless communication systems provide wireless connectivity to user equipment using devices such as base stations, access points, e-nodeBs, and the like. The base stations are typically connected to one or more antennas for transmitting and receiving radiofrequency signals. For example, some conventional wireless communication systems deploy antenna arrays that include arrays of antenna elements for transmitting and receiving signals. The passive antenna arrays used for uplink and downlink transmissions in legacy wireless communication systems can include multiple dipoles or other antenna elements that are driven by a single transceiver. Radiation from the multiple elements in a passive antenna array is therefore fully correlated.

Wireless communication equipment is designed to satisfy various requirements. One exemplary requirement includes an upper limit on the adjacent channel leakage ratio (ACLR) that is set by the requirement that leakage from one wireless communication channel should not reduce the capacity or throughput on another wireless communication channel by more than 5%. Compliance testing of equipment may be performed before the equipment is sold or deployed in the field to ensure that the wireless communication equipment satisfies the requirements. Equipment vendors and service providers may use the results of compliance testing to compare, select, purchase, configure, or deploy wireless communication equipment in the field. Compliance testing of passive antenna arrays can be performed by determining whether the test requirements are met at a reference point, such as a reference point at an antenna connection point or using far-field measurements at a distant reference point. For example, compliance testing at the antenna connection or in the far-field may be used to determine whether the transmitter satisfies a 45 dBc limit on the ACLR. The same requirements, such as the ACLR, can be applied at either the antenna connection point or the far-field point.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Active antenna arrays differ from passive antenna arrays at least in part because active antenna arrays use a different transceiver to drive each antenna element in the active antenna array. Radiation from the different antenna elements may therefore range from completely correlated to completely uncorrelated depending on the transmission parameters used by the different transceivers. Consequently, the same transmitter requirements cannot be applied at different reference points such as the antenna connection point and the distant reference point used for far-field measurements. For example, the innumerable number of possible implementations of the various beamforming weights, digital processing, and signal distributions applied to the antenna arrays in different deployment scenarios makes the far field requirement more complex than the requirement that can be applied at the antenna connection.

This presents a problem for equipment manufacturers and providers who would like to implement a standard approach to compliance testing that facilitates the comparison of different products produced by different equipment manufacturers. For example, some transmitters may be constructed using baseband circuitry that is separate from the antenna array. In that case, compliance requirements can easily be applied at the antenna connection point by sampling the signal provided by the baseband circuitry as it travels to the antenna array. However, other transmitters deploy the baseband circuitry and the antenna array in a single enclosed package and are not amenable to testing by sampling signals at the antenna connection point. These products are more amenable to far-field testing using a distant reference point. The disclosed subject matter is directed to addressing the effects of one or more of the problems set forth above.

In one embodiment, a method is provided for supporting the translation of testing requirements between different reference points. Some embodiments of the method include generating mapping information that relates at least one first requirement associated with an active antenna array to at least one second requirement associated with the active antenna array. The first requirements are associated with a first reference point and the second requirements are associated with a second reference point that differs from the first reference point. Some embodiments of the method also include storing the mapping information in a non-transitory computer-readable storage media.

In another embodiment, a method is provided for translating testing requirements between different reference points. Some embodiments of the method include accessing information indicating one or more first requirements associated with an active antenna array. The first requirements are associated with a first reference point. Some embodiments of the method also include determining one or more second requirements associated with the active antenna array based on measurements performed at a second reference point different than the first reference point. Some embodiments of the method also include translating the second requirements to correspond to one or more values associated with the first reference point. The translation is performed using mapping information that relates requirements associated with the first reference point and requirements associated with the second reference point.

In yet another embodiment, an apparatus is provided for translating testing requirements between reference points. Some embodiments of the apparatus include a translator configurable to access information indicating one or more first requirements associated with an active antenna array. The first requirements are associated with a first reference point. Some embodiments of the translator are also configurable to access information indicating one or more second requirements associated with the active antenna array. The second requirements are determined based on measurements performed at a second reference point different than the first reference point. Some embodiments of the translator are further configurable to translate the second requirements to correspond to one or more values associated with the first reference point. The translation is performed using mapping information that relates requirements associated with the first reference point and requirements associated with the second reference point.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, transceiver systems including base stations and active antenna arrays may not be amenable to testing at the same reference points. For example, some transmitters may be constructed using baseband circuitry that is separate from the antenna array. In that case, compliance requirements can be applied at the antenna connection point. However, other transmitters deploy the baseband circuitry and the antenna array in a single enclosed package and consequently testing these transmitters at the antenna connection point may require opening or destroying the package. Far-field testing at a distant reference point may therefore be preferable.

At least in part to provide the flexibility to perform compliance testing at different reference points, the present application describes embodiments of techniques for supporting the translation of testing requirements between different reference points. In some embodiments, a mapping may be defined so that the mapping may be used to translate between far-field requirements at a distant reference point and antenna connection requirements applied at an antenna connection point between baseband circuitry and the plurality of antenna elements. For example, correlation parameters for the antenna elements in the active antenna array may be used to relate far-field requirements to antenna connection requirements such as a first antenna connection requirement for the plurality of antenna elements and a second antenna connection requirement for one antenna element. The correlation parameter varies from a value of 1.0 when the antenna elements are fully correlated to a value of zero when the antenna elements are uncorrelated. The results of compliance testing of different transmitters can then be compared by converting between results of far-field measurements performed at the distant reference point for one set of transmitters and antenna connection point measurements performed for another set of transmitters.

Figure 1:
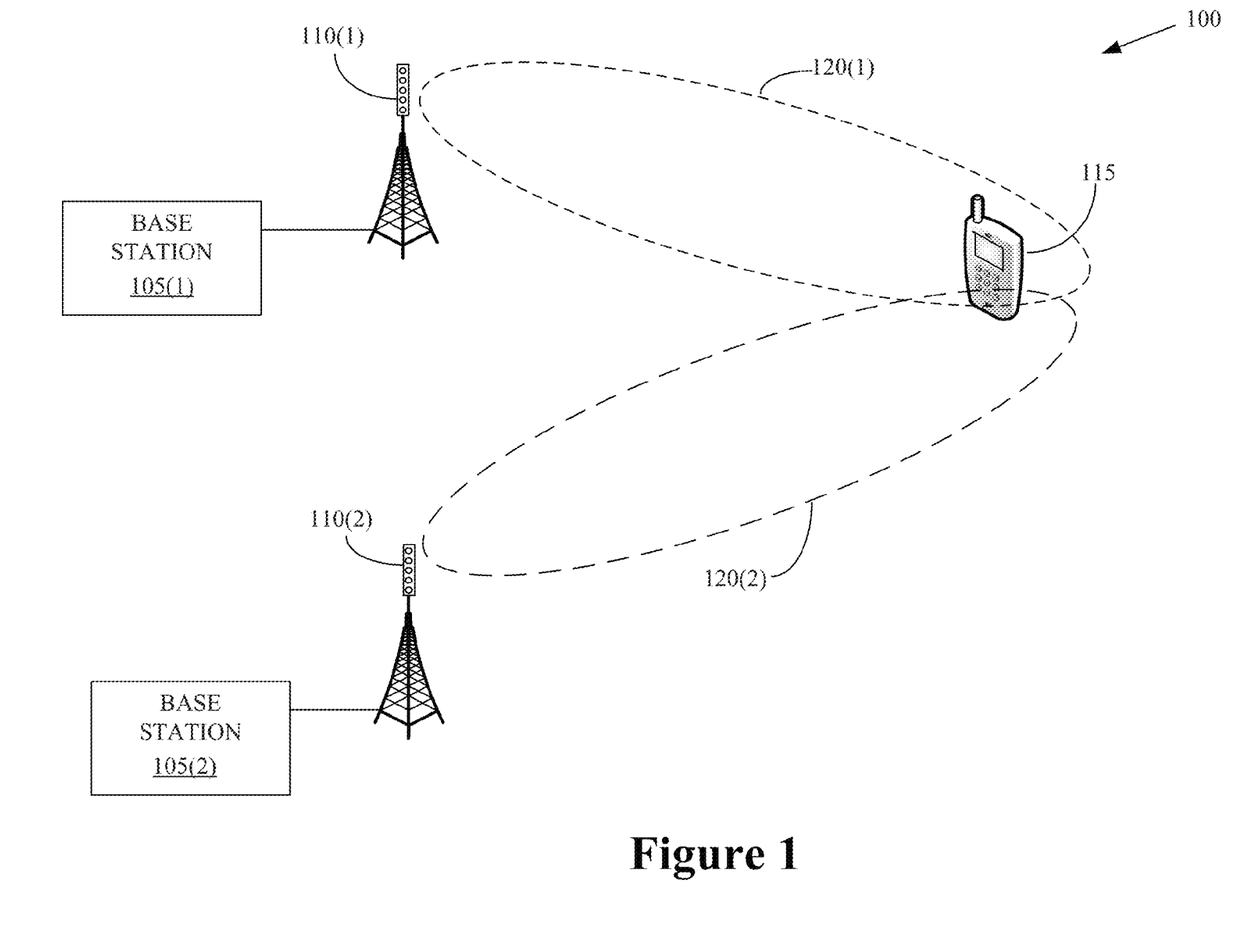
FIG. 1 conceptually illustrates one exemplary embodiment of a wireless communication system.

FIG. 1 conceptually illustrates one exemplary embodiment of a wireless communication system 100. In the illustrated embodiment, the wireless communication system 100 includes base stations 105 that are used to generate baseband signals that are provided to active antenna arrays 110. As used herein, the term "base station" should be understood to encompass devices including circuitry for generating baseband signals, base stations, base station routers, access point, e-nodeBs, home base station routers, femtocells, and the like. The base stations 105 may be used to provide wireless connectivity to user equipment 115. For example, the active antenna array 110(1) associated with the base station 105(1) may perform beamforming to transmit a beam 120(1) towards the user equipment 115 to support communication over one or more channels. The energy received by the user equipment 115 in the channels supported by the beam 120(1) may be referred to as the "wanted" energy. However, the base stations 105 may also provide "unwanted" interfering signals to the user equipment 115. For example, energy transmitted from the active antenna array 110(2) in the beam 120(2) on other channels may leak into the channels supported by the beam 120(1) and interfere with communication between the base station 105(1) and the user equipment 115.

The base stations 105 or the active antenna arrays 110 may be characterized by various requirements. For example, the active antenna arrays 110 may be characterized by an adjacent channel leakage power ratio (ACLR) that is defined as the ratio of the mean power centered on an assigned channel frequency to the mean power centered on an adjacent channel frequency. For base stations 105 that include active antenna arrays 110, the ACLR requirement can be applied or tested at different reference points including, but not limited to, output nodes of individual transceivers (not shown in FIG. 1) coupled to elements of the active antenna arrays 110, an output node of a Radio Distribution Network (not shown in FIG. 1) coupled to elements of the active antenna arrays 110, or far-field reference points that are far enough from the active antenna array 110 to sample the far field signal generated by the active antenna array 110. The ACLR may have a spatial characteristic such that values of the ACLR determined by measuring characteristics of signals received at the different reference points may differ from each other at least in part due to beamforming properties and use of multiple transceivers of the active antenna array 110.

Establishing requirements for compliance testing at a single reference point, e.g. at the antenna connection(s) of the transceivers, has the benefit of simplicity and ease of implementation. However, compliance testing at the antenna connection point also poses practical challenges for implementations of the base stations 105 and the active antenna arrays 110 in which access to antenna connection(s) is difficult or infeasible. Conversely, compliance testing of the base stations 105 and the active antenna arrays 110 in the far-field region requires very large physical structures because the far-field region may extend to 100 meters or more from the active antenna arrays 110. In the illustrated embodiment, a default reference point may therefore be defined and then relationships for translating between requirements at the default reference point and other reference points may be established and used for compliance testing. The default reference points are selected in some embodiments based on the criteria that the default reference point satisfies a majority of the radiofrequency requirements that need to be redefined for active antenna arrays (relative to passive antenna arrays). An alternative reference point may be defined for requirements that have spatial characteristics that can or should be captured with far field requirements.

The default reference requirement and any additional reference requirements should result in the same compliance performance, e.g. the two requirements should be defined so that they can be mapped to each other. The innumerable number of possible implementations of the various beamforming weights, digital processing, and signal distributions that may be used to configure or operate the antenna arrays in different deployment scenarios makes the far field requirement more complex. Some embodiments of the compliance testing described herein may therefore define the mapping between the different reference points on the basis of correlations between the signals transmitted by the different elements in the active antenna arrays 110. The parameters and procedures that define a mapping can be declared as part of the test procedure. In one embodiment, testing requirements for the base stations 105 or active antenna arrays 110 may be established by requiring that the capacity or throughput loss of the victim system shall not exceed 5%. For example, the spatial impacts of the active antenna arrays 110 may be modelled by taking the 95% cumulative distribution function (CDF) of the ACLR value that is obtained over various implementations of the wireless communication system 100.

Figure 2:
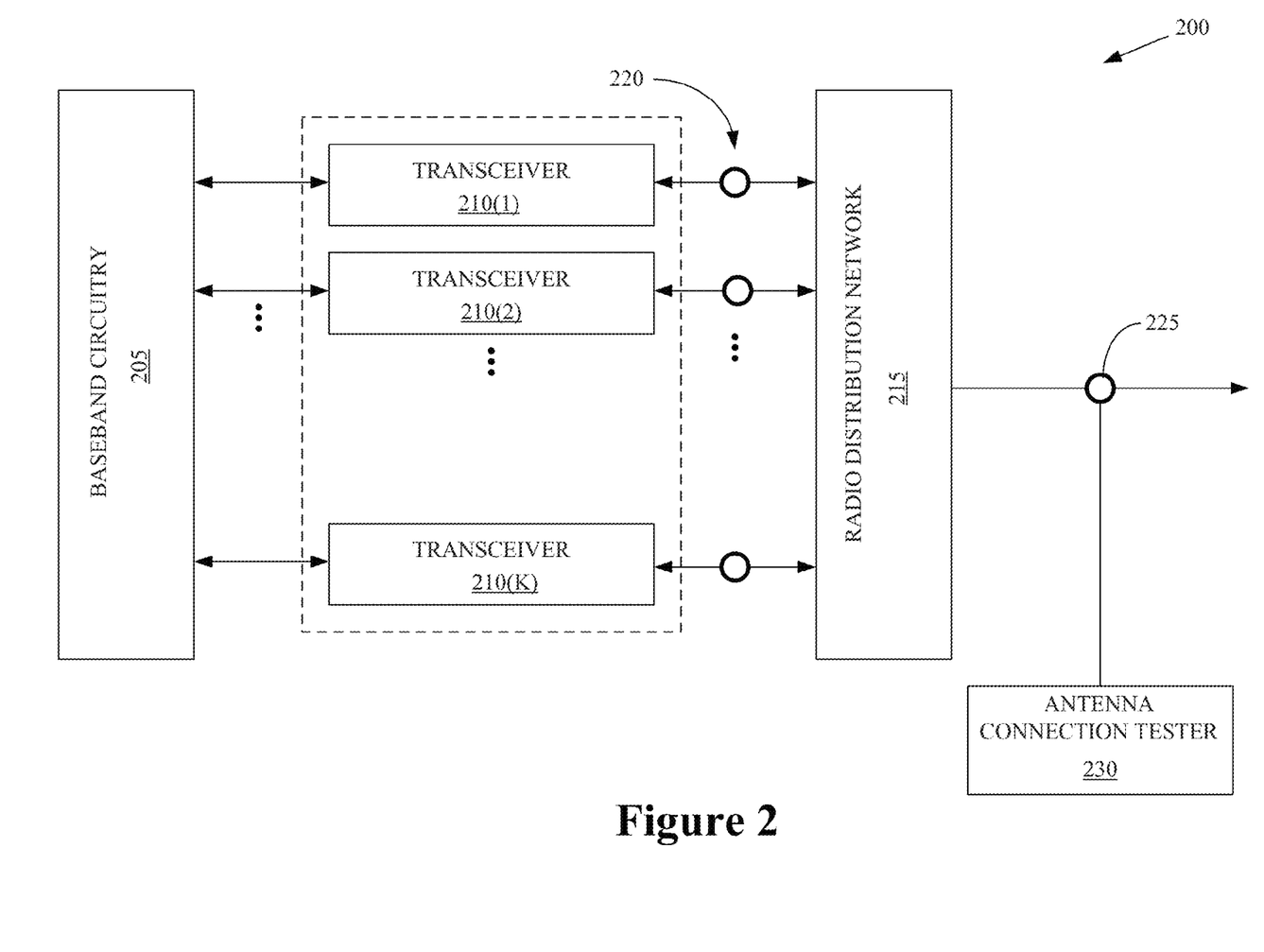
FIG. 2 conceptually illustrates one exemplary embodiment of a transceiver device that may be coupled to active antenna array.

FIG. 2 conceptually illustrates one exemplary embodiment of a transceiver device 200 that may be coupled to an active antenna array. In the illustrated embodiment, the transceiver device 200 includes baseband circuitry 205 that is used to generate baseband signals for transmission over the air interface. The baseband circuitry 205 may be implemented in a base station. The baseband circuitry 205 provides baseband signals to transceivers 210 that are part of a transceiver array 215 that includes K transceivers 210 associated with L elements of an active antenna array. In the illustrated embodiment, the transceivers 210 are coupled to a radio distribution network 215. However, alternative embodiments of the transceiver device 200 may not include a radio distribution network 215. The radio distribution network 215, if present, performs the distribution of the TX outputs from the transceivers 210 into the corresponding antenna paths and antenna elements, and a distribution of RX inputs from antenna paths in the reverse direction to the transceivers 210. For example, the radio distribution network 215 may be used to map the K radiofrequency input signals to the L antenna elements. The radio distribution network 215 may therefore support connection of one transceiver to 1, 2, or all L antenna elements.

Compliance testing may be performed at the nodes 220 between the transceivers 210 and the radio distribution network 215. Testing at the nodes 220 corresponds to the conventional compliance testing reference point for a passive antenna array. In the illustrated embodiment, compliance testing is performed at the node 225, which may be referred to as the antenna connection point because the elements of the active antenna array can be coupled to the radio distribution network 215 at the node 225. During compliance testing of the transceiver device 200, an antenna connection tester 230 may be physically, electromagnetically, or communicatively coupled to the node 225 (as shown in FIG. 2) to sample signals that are conveyed between the radio distribution network 215 and the active antenna array. Some embodiments of the antenna connection tester 230 can perform measurements that are used to derive values of testing requirements (such as the ACLR). As discussed herein, the derived values of the testing requirements at the antenna connection node 225 may be converted or translated into values representative of the testing requirements at other reference points.

Figure 3A:
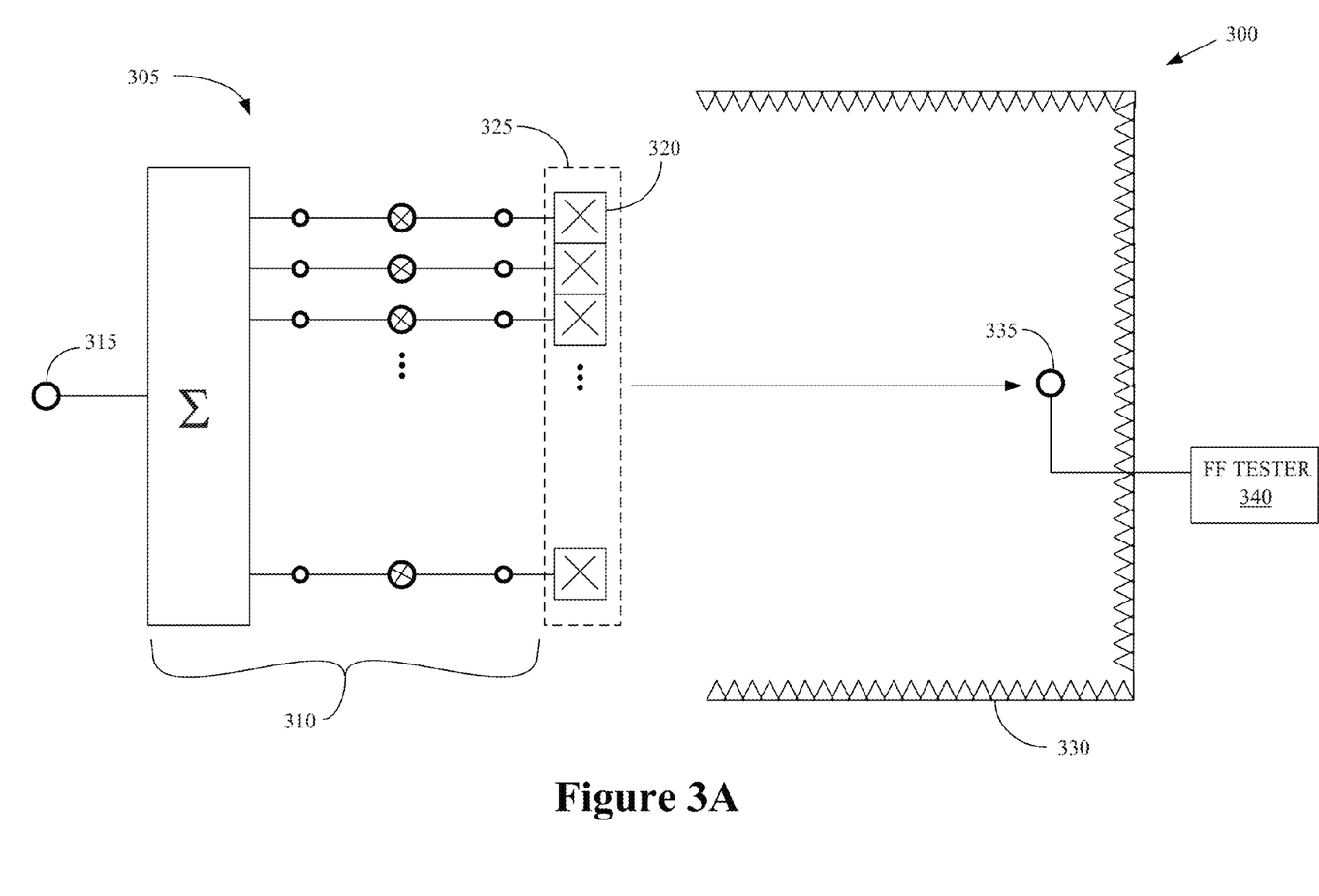
FIG. 3A conceptually illustrates a first exemplary embodiment of a testing apparatus that can be used to perform far-field testing of a transceiver device.

FIG. 3A conceptually illustrates a first exemplary embodiment of a testing apparatus 300 that can be used to perform far-field testing of a transceiver device 305. In the illustrated embodiment, the transceiver device 305 includes a radio distribution network 310 that distributes a signal received at the node 315 to antenna elements 320 (in the interest of clarity only one indicated by a reference numeral) and an active antenna array 325. The testing apparatus also includes an anechoic chamber 330 that is designed to stop reflections of electromagnetic waves. For example, the anechoic chamber 330 may be designed to reduce or stop reflections of electromagnetic waves in a frequency band corresponding to frequencies used to transmit or receive signals at the active antenna array 325. Techniques for implementing anechoic chambers 330 are known in the art and in the interest of clarity are not discussed further herein.

A far-field reference point 335 may be defined in the anechoic chamber 330 at a distance that is sufficiently far from the transceiver device 305 to measure the far-field electromagnetic field created by the active antenna array 325. Techniques for selecting a distance sufficiently far from the source to sample the far-field behavior of the active antenna array 325 (e.g., based upon the wavelength or the diffraction behavior of the radiation) are known in the art. During compliance testing of the transceiver device 305, a far-field tester 340 can be deployed at the reference point 335 or can be coupled to one or more sensors deployed at the reference point 335 to sample signals transmitted by the active antenna array 325. Some embodiments of the far-field tester 340 can perform measurements that are used to derive values of testing requirements (such as the ACLR). As discussed herein, the derived values of the testing requirements at the far-field reference point 335 may be converted or translated into values representative of the testing requirements at other reference points, such as the antenna connection reference point 225 shown in FIG. 2.

Figure 3B:
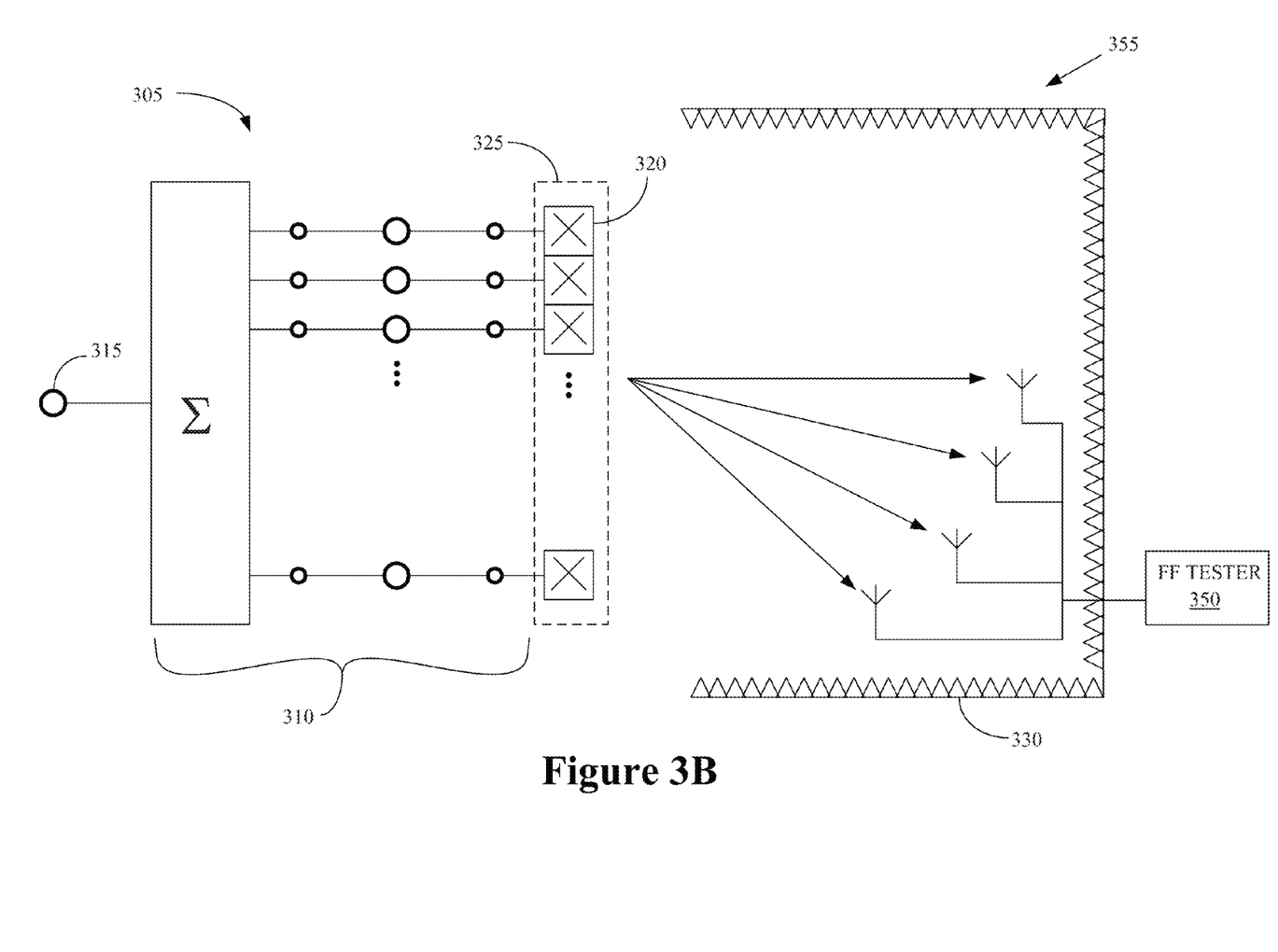
FIG. 3B conceptually illustrates a second exemplary embodiment of a testing apparatus that can be used to perform far-field testing of a transceiver device.

FIG. 3B conceptually illustrates a second exemplary embodiment of a testing apparatus 350 that can be used to perform far-field testing of a transceiver device 305. The second exemplary embodiment of the testing apparatus 350 differs from the first exemplary embodiment of the testing apparatus 300 because the far-field tester 355 is configurable to sense the far-field radiation pattern generated by the transceiver device 305 at a plurality of different locations within the anechoic chamber 330. Some embodiments of the far-field tester 355 may be configured to sense the far-field radiation pattern at locations that have different angles-of-arrival with respect to the transceiver device 305. However, other embodiments of the far-field tester 350 may be configured to sense the far-field radiation pattern at other locations within the anechoic chamber 330. Some embodiments of the far-field tester 355 can perform measurements that are used to derive values of testing requirements (such as the ACLR) that correspond to the different measurement locations. As discussed herein, the derived values of the testing requirements at the different measurement locations may be converted or translated into values representative of the testing requirements at other reference points, such as the antenna connection reference points 220, 225 shown in FIG. 2.

Some embodiments of the transceiver devices 305 may generate a maximum power that is approximately equal to the sum of the powers transmitted by the individual antenna elements 320 of the active antenna array 325. The maximum power is equivalent to the transmitted power when all the signals add coherently in the main beam generated by the active antenna array 325, e.g. the beam 120(1) shown in FIG. 1. The level of unwanted signals used to estimate the ACLR may be calculated by assuming or estimating different levels of correlations between signals transmitted by the individual antenna elements 320. For example, simulation studies have demonstrated that fully correlated unwanted emission from the antenna elements 320 corresponds to the worst case absolute unwanted emissions. However, the correlation values of the different antenna elements 320 may be difficult to model and thus values in a range from 0 to 1.0 may be used. Some embodiments may assume the worst case value of 1.0 when calculating the ACLR for the transceiver device 305. This approach provides for a requirement that ensures the worst case coexistence or a requirement that is valid and not dependent on deployed system correlation parameter.

Translating between the testing requirements at different reference points may allow testing requirements to be defined at a single reference point and then compared to tests performed at other reference points. Some embodiments of the testing apparatuses 340, 350 may therefore define the testing requirements at the antenna connection point. These definitions of the testing requirements may be consistent with the conducted measurements approach as provided in the FCC guidance, namely the Measure-and-Sum approach. Embodiments of these testing requirements may also be consistent with the fully correlated unwanted emissions where the antenna connection point requirement would be identical to the far field over-the-air requirement for testing requirements such as ACLR. For example, an ACLR of 45 dBc at the antenna connection point may be used as a testing requirement and then translated as necessary to other reference points.

As discussed herein, testing of the transceiver devices 305 for compliance with the core requirement does not necessarily have to be done at the same reference point as the reference point at which the requirement is defined. In other words, the conformance test specification may define more than one reference point where the requirement may be tested. How the test requirement at these reference points is derived from the core requirement may be described in the test specification. This procedure can take into account the parameters declared by the manufacturer. Note that if the requirement can be tested at multiple points there may be multiple methods for deriving test requirements. For demonstrating conformance it is sufficient to perform the test at one of the described test points and then translate to the reference point defined in these tests specification, as described herein.

In some embodiments, requirements defined at the antenna connection point or in the far-field may be equivalent so that the antenna connection requirement can be translated or mapped to the far field requirements and vice versa. For example, for the transmitter spurious emission requirement, the antenna connection and far field requirements can be approximated by:

$$\text{FarField-Req} \approx r^*\text{AntConnector-Req} + (1-r)^*\text{AntConnector-Req2},$$

where AntConnector-Req2 is the antenna connection-based requirement that applies when the active antenna array 325 consists of a single element 320. The parameter r indicates the degree of correlation between the signals transmitted by the different elements 320. When r approaches 1.0, the far field requirement would be the same as antenna connection requirement. When r approaches 0.0, the far field requirement would be the same as an active antenna array 325 that includes a single antenna element 320. In some embodiments, the values of the parameter r may be determined by the equipment specifications, beamforming weights, phases, or other parameters used to transmit signals from the elements 320. Persons of ordinary skill in the art having benefit of the present disclosure should appreciate that alternative embodiments may use different relationships to translate between the testing requirements at different reference points. These relationships may be determined experimentally, empirically, theoretically, using models, or other techniques or combinations of these techniques.

Figure 4:
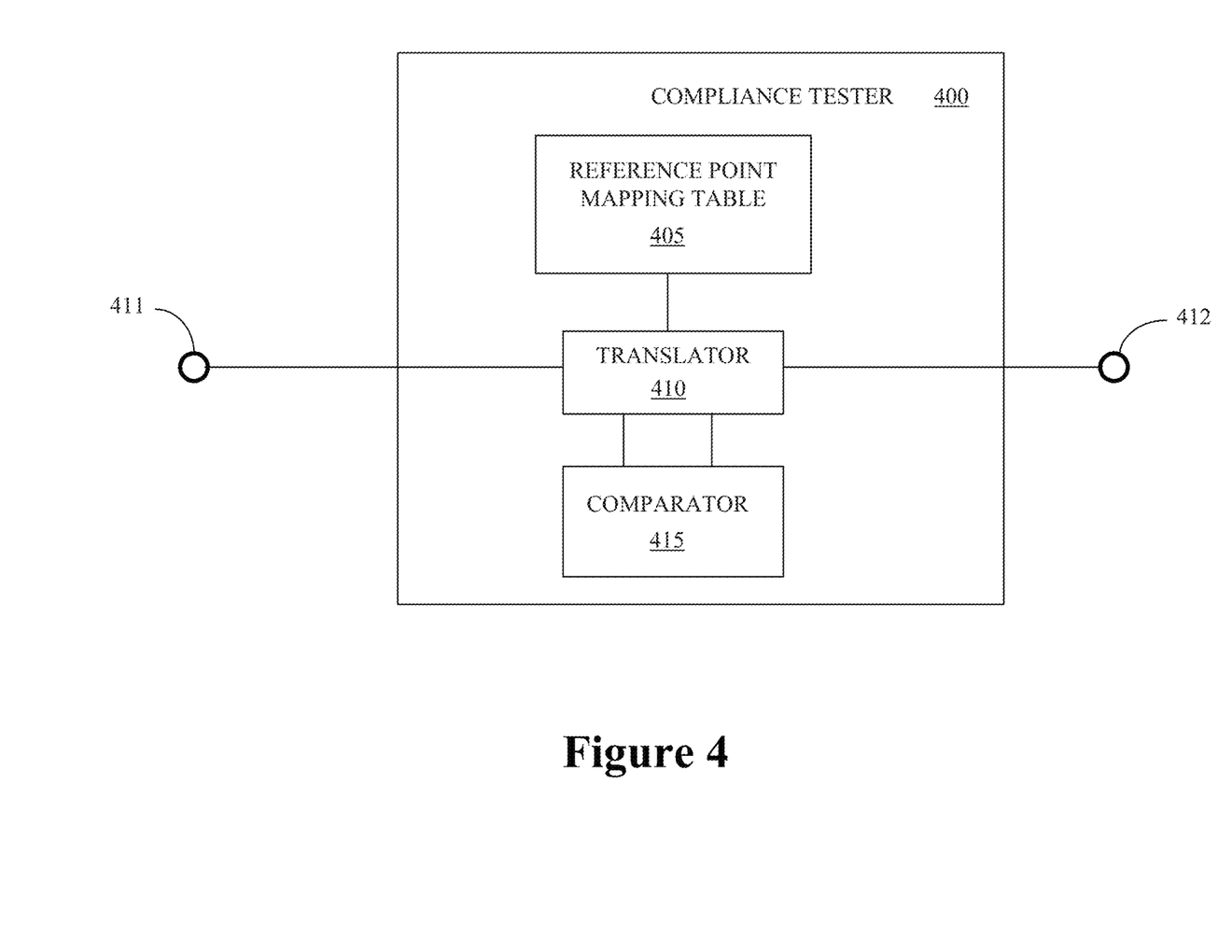
FIG. 4 conceptually illustrates one exemplary embodiment of a compliance tester.

FIG. 4 conceptually illustrates one exemplary embodiment of a compliance tester 400. Some embodiments of the compliance tester 400 may be used as the antenna connection tester 230 shown in FIG. 2 or the far-field testers 340, 350 shown in FIGS. 3A-3B. In the illustrated embodiment, the compliance tester 400 includes a reference point mapping table 405. Some embodiments of the reference point mapping table 405 may be used to relate testing requirements at different reference points based upon a value of a correlation parameter associated with the active antenna array under test. For example, the reference point mapping table 405 may be used to relate the testing requirements at an antenna connection reference point and a field reference point using a relationship that is determined based on the correlation parameter associated with antenna elements in an active antenna array, as discussed herein.

The compliance tester 400 shown in FIG. 4 also includes a translator 410. The translator 410 may receive (at node 411) information indicative of a value of a testing requirement that is derived based on measurements performed at a first reference point, such as measurements performed at a far-field reference point. The translator may also receive (at node 412) information indicative of a testing requirement defined for the test, such as a threshold value of 45 dBc for an ACLR at an antenna connection reference point. Alternatively, the compliance tester 400 may have the information indicative of the testing requirements defined for the test stored internally, e.g., in RAM, SRAM, or DRAM. The translator 410 may be configured to translate the testing requirements at one or more of the reference points to values that correspond to other reference points. For example, the translator 410 may translate the values of the testing requirement determined based on measurements at the far field reference point to values that correspond to the testing requirement at the antenna connection reference point. Alternatively, the translator 410 may translate a threshold value of a testing requirement at the antenna connection reference points to corresponding values at the far-field reference point.

The translated values can be provided to a comparator 415 implemented in the compliance tester 400. Since the translator 410 has translated the values of the testing requirements to a common reference point, the comparator 415 can directly compare the translated values received from the translator 410. For example, the comparator 415 may determine whether the device under test satisfies the compliance requirements by achieving an ACLR at the far-field reference point that corresponds to a threshold value of 45 dBc for an ACLR at an antenna connection reference point.

Figure 5:
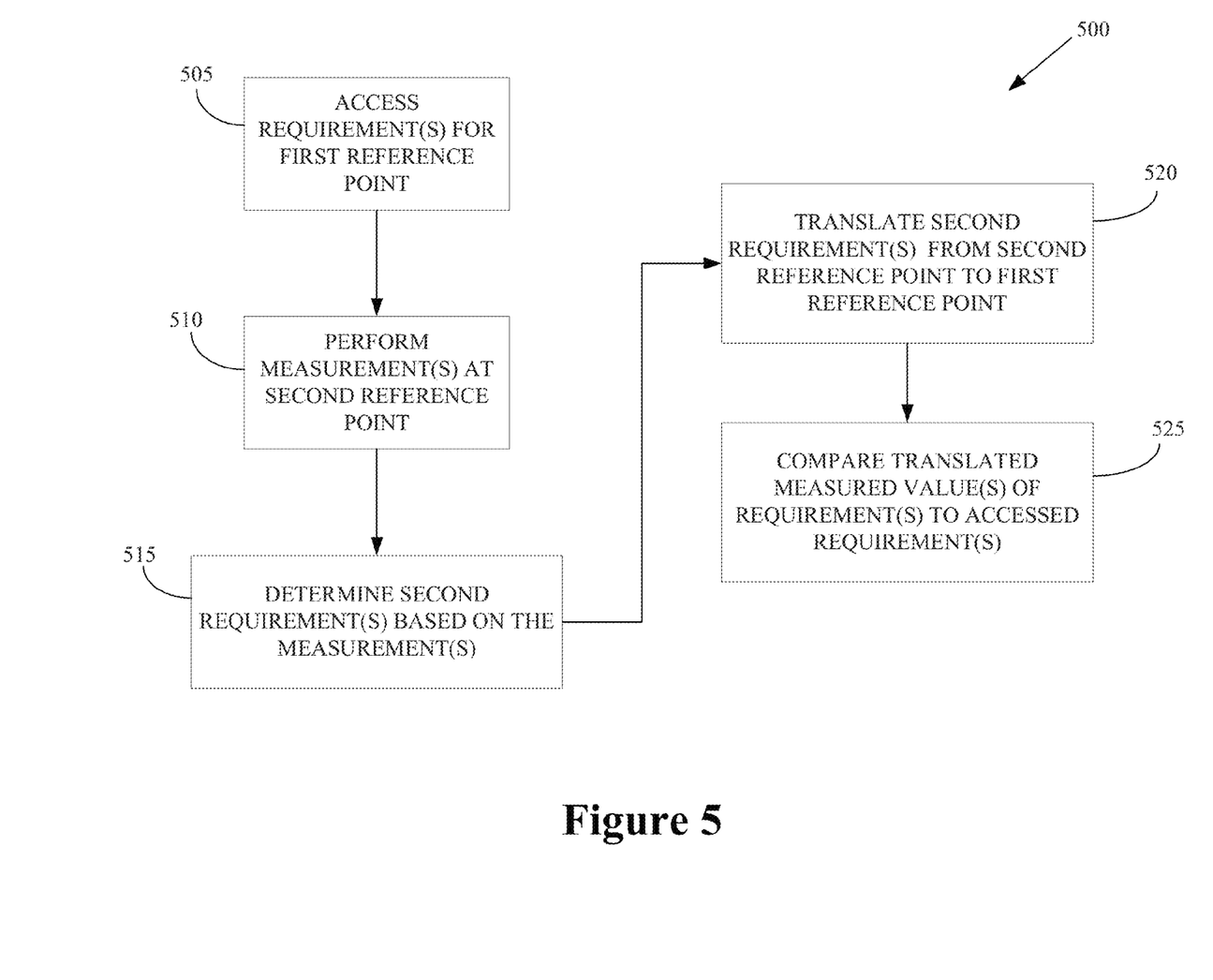
FIG. 5 conceptually illustrates one exemplary embodiment of a method for translating test requirements for active antenna arrays between different reference points.

FIG. 5 conceptually illustrates one exemplary embodiment of a method 500 for translating test requirements for active antenna arrays between different reference points. Some embodiments of the method 500 may be implemented in a test apparatus such as the testers 340, 350, 400 shown in FIGS. 3A, 3B, and 4. In the illustrated embodiment, the tester accesses (at 505) one or more requirements associated with a first reference point, such as an antenna connection point or a far-field reference point. The tester or another sensor that is physically, electromagnetically, or communicatively coupled to the tester performs (at 510) measurements at a second reference point that can be used to derive (at 515) values of the testing requirements. However, as discussed herein, the values derived (at 515) based on the measurements at the second reference point may not be directly comparable to values specified at the first reference point.

The tester may therefore translate (at 520) the testing requirements for the second reference point to values that correspond to the first reference point, e.g., using a mapping table that maps values at the second reference point to the first reference point based in part on correlation values associated with the active antenna array. The tester may then compare (at 530) the translated value to the values of the test requirements at the first reference point. The comparison may be used to determine whether the device under test complies with the testing requirements that are defined for the first reference point. The translated test requirements may also be used to compare test results for different devices under test because the translated test requirements refer to a common reference point, e.g. the first reference point.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   generating mapping information that relates at least one first requirement associated with an active antenna array to at least one second requirement associated with the active antenna array, wherein said at least one first requirement is associated with a first reference point located between baseband circuitry and the active antenna array and said at least one second requirement is associated with a second reference point located in a far-field region of the active antenna array; and
   storing said mapping information in a non-transitory computer-readable storage media.

2. The method of claim 1, wherein said at least one first requirement comprises a first threshold value of an adjacent channel leakage ratio associated with an antenna connection point located between the baseband circuitry and the active antenna array.

3. The method of claim 2, wherein said at least one second requirement comprises a second threshold value of the adjacent channel leakage ratio associated with the second reference point located in the far-field region of the active antenna array.

4. The method of claim 2, wherein said at least one second requirement comprises a plurality of second threshold values of the adjacent channel leakage ratio associated with a plurality of reference points located in the far-field region of the active antenna array, wherein the plurality of reference points are associated with different angles-of-arrival at the active antenna array.

5. The method of claim 1, wherein generating the mapping information comprises generating the mapping information based on a correlation parameter associated with the active antenna array and at least one predetermined value of at least one of the first requirement or the second requirement.

6. The method of claim 1, comprising translating at least one measured value of at least one requirement using the mapping table, wherein said at least one measured value is measured at one of the first and second reference points and the translated value of said at least one measured value corresponds to the other one of the first and second reference points.

7. A method comprising:
   generating mapping information that relates at least one first requirement associated with an active antenna array to at least one second requirement associated with the active antenna array, wherein said at least one first requirement is associated with a first reference point and said at least one second requirement is associated with a second reference point that differs from the first reference point, wherein generating the mapping information comprises generating the mapping information based on a correlation parameter associated with the active antenna array, and wherein the correlation parameter varies from a value of 1.0 when antenna elements in the active antenna array are fully correlated and a value of 0 when antenna elements in the active antenna array are uncorrelated; and
   storing said mapping information in a non-transitory computer-readable storage media.

8. A method, comprising:
   accessing information indicating at least one first requirement associated with an active antenna array, said at least one first requirement being associated with a first reference point located between baseband circuitry and the active antenna array;
   determining at least one second requirement associated with the active antenna array based on measurements performed at a second reference point located in a far-field region of the active antenna array; and
   translating said at least one second requirement to correspond to at least one value associated with the first reference point, wherein said translation is performed using mapping information that relates requirements associated with the first reference point and requirements associated with the second reference point.

9. The method of claim 8, wherein said at least one first requirement comprises a first threshold value of an adjacent channel leakage ratio applied at an antenna connection point located between the baseband circuitry and the active antenna array.

10. The method of claim 9, wherein said at least one second requirement comprises a value of the adjacent channel leakage ratio determined based on measurements performed at the second reference point located in the far-field region of the active antenna array.

11. The method of claim 9, wherein said at least one second requirement comprises a plurality of values of the adjacent channel leakage ratio determined based on measurements performed at a plurality of reference points located in the far-field region of the active antenna array, wherein the plurality of reference points are associated with different angles-of-arrival at the active antenna array.

12. The method of claim 8, wherein the mapping information is generated based on a correlation parameter associated with the active antenna array and at least one predetermined value of at least one of the first requirement or the second requirement.

13. The method of claim 8, comprising comparing the translated values of said at least one second requirement to values of said at least one first requirement.

14. A method, comprising;
   accessing information indicating at least one first requirement associated with an active antenna array, said at least one first requirement associated with a first reference point;
   determining at least one second requirement associated with the active antenna array based on measurements performed at a second reference point different than the first reference point; and
   translating said at least one second requirement to correspond to at least one value associated with the first reference point, wherein said translation is performed using mapping information that relates requirements associated with the first reference point and requirements associated with the second reference point, wherein the mapping information is generated, based on a correlation parameter associated with the active antenna array, and wherein the correlation parameter varies from a value of 1.0 when antenna elements in the active antenna array are fully correlated and a value of 0 when antenna elements in the active antenna array are uncorrelated.

15. An apparatus, comprising:
   a translator configurable to:
   access information indicating at least one first requirement associated with an active antenna array, said at least one first requirement being associated with a first reference point located between baseband circuitry and the active antenna array;

access information indicating at least one second requirement associated with the active antenna array, wherein said at least one second requirement is determined based on measurements performed at a second reference point located in a far-field region of the active antenna array; and translate said at least one second requirement to correspond to at least one value associated with the first reference point, wherein said translation is performed using mapping information that relates requirements associated with the first reference point and requirements associated with the second reference point.

16. The apparatus of claim 15, wherein said at least one first requirement comprises a first threshold value of an adjacent channel leakage ratio applied at an antenna connection point located between the baseband circuitry and the active antenna array.

17. The apparatus of claim 16, wherein said at least one second requirement comprises a value of the adjacent channel leakage ratio determined based on measurements performed at the second reference point located in the far-field region of the active antenna array.

18. The apparatus of claim 16, wherein said at least one second requirement comprises a plurality of values of the adjacent channel leakage ratio determined based on measurements performed at a plurality of reference points located in the far-field region of the active antenna array, wherein the plurality of reference points are associated with different angles-of-arrival at the active antenna array.

19. The apparatus of claim 15, comprising a reference point mapping table configurable to store mapping information that is generated based on a correlation parameter associated with the active antenna array and at least one predetermined value of at least one of the first requirement or the second requirement, and wherein the translator is configurable to access the mapping information stored in the reference point mapping table.

20. The apparatus of claim 15, comprising a comparator configurable to compare the translated values of said at least one second requirement to values of said at least one first requirement.

21. An apparatus, comprising:
a translator configurable to:
access information indicating at least one first requirement associated with an active antenna array, said at least one first requirement being associated with a first reference point;
access information indicating at least one second requirement associated with the active antenna array, wherein said at least one second requirement is determined based on measurements performed at a second reference point different than the first reference point; and
translate said at least one second requirement to correspond to at least one value associated with the first reference point, wherein said translation is performed using mapping information that relates requirements associated with the first reference point and requirements associated with the second reference point; and
a reference point mapping table configurable to store mapping information that is generated based on a correlation parameter associated with the active antenna array, wherein the correlation parameter varies from a value of 1.0 when antenna elements in the active antenna array are fully correlated and a value of 0 when antenna elements in the active antenna array are uncorrelated, and wherein the translator is configurable to access the mapping information stored in the reference point mapping table.

* * * * *